United States Patent [19]

Dohnalik

[11] Patent Number: 4,929,143
[45] Date of Patent: May 29, 1990

[54] QUICK-ATTACHING MECHANISM

[75] Inventor: Martin F. Dohnalik, Yankton, S. Dak.

[73] Assignee: Gehl Company, West Bend, Wis.

[21] Appl. No.: 304,666

[22] Filed: Jan. 31, 1989

[51] Int. Cl.⁵ ................................................. E02F 9/00
[52] U.S. Cl. ................................... 414/723; 403/316; 403/330; 172/272
[58] Field of Search ................ 414/723; 403/330, 316; 172/272–275

[56] References Cited

U.S. PATENT DOCUMENTS

| | | |
|---|---|---|
| 3,543,867 | 12/1970 | Smemo . |
| 3,658,198 | 4/1972 | Keskitalo . |
| 3,672,521 | 6/1972 | Bauer et al. . |
| 3,672,724 | 6/1972 | Neuzil, Sr. . |
| 3,705,656 | 12/1972 | Hunger et al. . |
| 3,743,126 | 7/1973 | Seaberg . |
| 3,760,883 | 9/1973 | Birk . |
| 3,794,195 | 2/1974 | Clevenger et al. . |
| 3,887,096 | 6/1975 | Wieland . |
| 3,985,249 | 10/1976 | Aker et al. . |
| 4,085,856 | 4/1978 | Westendorf . |
| 4,106,645 | 8/1978 | Janish . |
| 4,136,792 | 1/1979 | Wilson . |
| 4,243,356 | 1/1981 | Takojima . |
| 4,253,793 | 3/1981 | Braml . |
| 4,355,945 | 10/1982 | Pilch ........................... 414/723 X |
| 4,417,844 | 11/1983 | Pingon ........................... 414/723 |
| 4,436,477 | 3/1984 | Lenertz et al. . |
| 4,632,595 | 12/1986 | Schaeff ........................ 414/723 X |
| 4,663,866 | 5/1987 | Karlsson et al. . |
| 4,747,612 | 5/1988 | Kuhn . |

*Primary Examiner*—Robert J. Spar
*Assistant Examiner*—Donald W. Underwood
*Attorney, Agent, or Firm*—Andrus, Sceales, Starke & Sawall

[57] ABSTRACT

A quick-attaching mechanism for mounting an implement to the remote end of a boom or the like includes a mounting structure provided at the end of the boom and a receiving structure provided on the implement. The mounting structure and receiving structure are provided with upper pivotable engagement means defining an upper pivot axis. When pivoting the mounting structure and the receiving structure about the pivot axis to an engaged position, a latch mechanism provided at the lower end of the mounting structure is automatically moved to its latching position for securely connecting the implement to the boom. The latching mechanism is a pivotable latch member, which is manually movable to a release position for allowing uncoupling of the implement from the mounting structure.

18 Claims, 3 Drawing Sheets

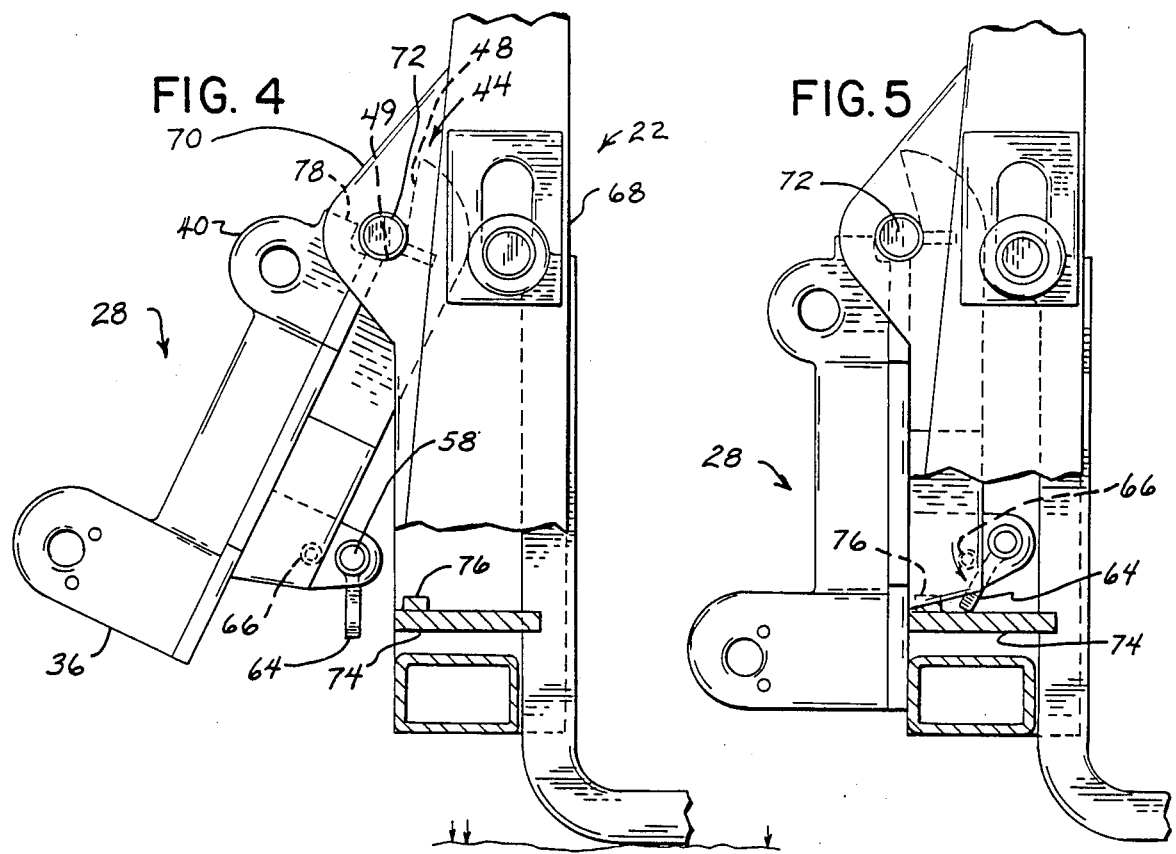
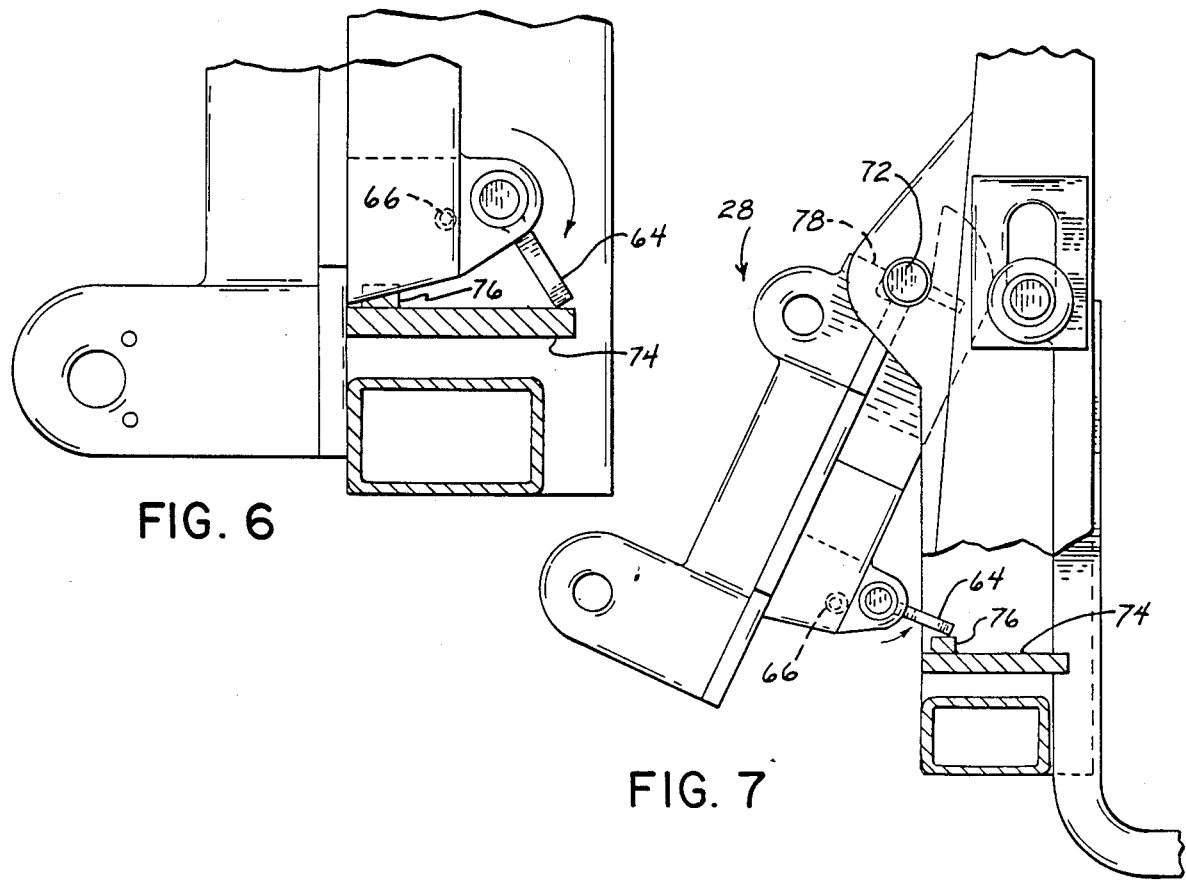

QUICK-ATTACHING MECHANISM

BACKGROUND AND SUMMARY

This invention relates to material handling equipment, and more particularly to a quick-attaching mechanism for removably attaching a material handling implement to the end of a boom structure or the like.

Various prior art mechanisms are known for providing quick attachment of a material handling implement to a boom structure or the like associated with a vehicle. Most prior art quick-attaching systems employ a four-point interlocking system between the implement and a mounting structure provided at the end of the boom structure. This type of system requires accurate positioning of the mounting structure relative to the implement in order to ensure satisfactory mounting of the implement thereto.

Additionally, many prior art quick-attaching systems utilize a pin and hole arrangement for securing the implement to the mounting structure. Various mechanisms are known for engaging the pins with the holes, such as hydraulic actuation or manual over-center lever systems. There are a number of drawbacks to this type of system. One such drawback is that the pins can become lost, requiring replacement. Additionally, the pins may become bent or worn, requiring maintenance before the system can again function properly.

It is an object of the present invention to provide a rugged and easily manufactured quick-attaching mechanism for securing an implement to the end of a boom. It is further an object of the invention to provide a quick-attaching mechanism in which the implement is easily engaged with the boom mounting structure, and in which the mechanism for securing the implement to the boom structure is simple and easily operated.

In accordance with the present invention, a quick-attaching mechanism for coupling an implement to the remote end of a boom structure includes a mounting structure provided at the remote end of the boom structure and a receiving structure provided on the implement. The receiving structure is engageable by the mounting structure for removably attaching the implement to the boom structure. Upper pivoting engagement means is provided for pivotably engaging the mounting structure and the receiving structure. The upper pivoting engagement means provides an upper pivot axis allowing pivoting movement of the mounting structure and the receiving structure between an engaged position and a disengaged position. Lower latching means is provided on the mounting structure, and is movable between a latching position and a release position. Lower stationary engagement means is provided on the receiving structure. Pivoting movement of the mounting structure and the receiving structure from their disengaged position to their engaged position causes the lower latching means to engage the lower stationary engagement means, resulting in movement of the latching means to its latching position wherein it engages the lower stationary engagement means. This action securely couples the implement to the boom structure. After use, the latching means is moved to its release position so as to uncouple the implement and the boom structure by allowing pivoting movement between the mounting structure and the receiving structure from their engaged position to their disengaged position. The lower latching means is preferably a single lower latching member interposed between the mounting structure and the receiving structure to provide a three-point interlock system to securely connect the mounting structure and the receiving structure. The upper pivoting engagement means preferably comprises a transverse shaft mounted to the receiving structure, and a shaft seat and a pair of upstanding prongs provided on the mounting structure for engaging the shaft. With such a three-point mounting arrangement, engagement of the shaft with the prongs and rearward movement of the upper end of the mounting structure results in a self-aligning mounting system, providing ease in operation and a wider range of satisfactory approach angles.

BRIEF DESCRIPTION OF THE DRAWINGS

The drawings illustrate the best mode presently contemplated of carrying out the invention.

In the drawings:

FIG. 4 is a partial side elevation view, with portions broken away, showing the mounting structure of FIGS. 2 and 3 prior to engagement with an implement including a receiving structure;

FIG. 5 is a view similar to FIG. 4, showing the mounting structure and the implement receiving structure in their engaged position;

FIG. 6 is an enlarged side elevation view, showing the latching mechanism of the mounting structure moved to its release position;

FIG. 7 is a view similar to FIGS. 4 and 5, showing movement of the mounting structure to its disengaged position relative to the implement receiving structure;

DETAILED DESCRIPTION OF THE PREFERRED EMBODIMENT

Figure 1:
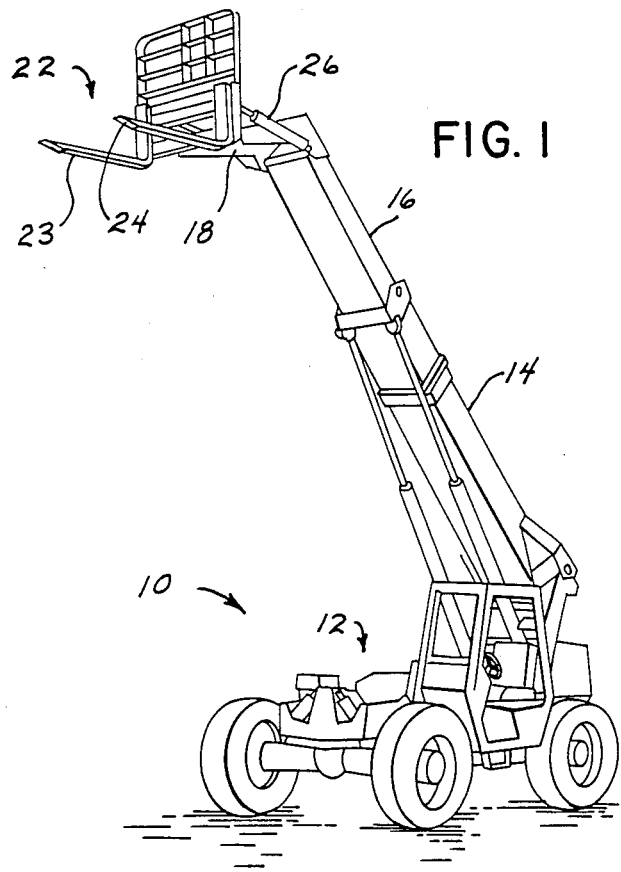
FIG. 1 is an isometric view of an extendable boom lift vehicle with which the quick-attaching mechanism of the invention is intended for use.

As shown in FIG. 1, an extendable boom lift vehicle 10 includes a vehicle portion 12 to which a pair of telescoping booms 14, 16 are mounted, all as is well known. A support member 18 is mounted to the remote end of outer boom 16. A carriage assembly 22, including a pair of lower tines 23, 24, is mounted to support member 18, and a pair of tilt cylinders, one of which is shown at 26, are provided for controlling the orientation of carriage assembly 22.

The precise construction of lift vehicle 10 can vary from that described, as many such vehicles are known. For example, booms 14, 16 can be single-section or multiple-section booms, and a single tilt cylinder may be used in place of the pair of tilt cylinders illustrated.

Figure 2:
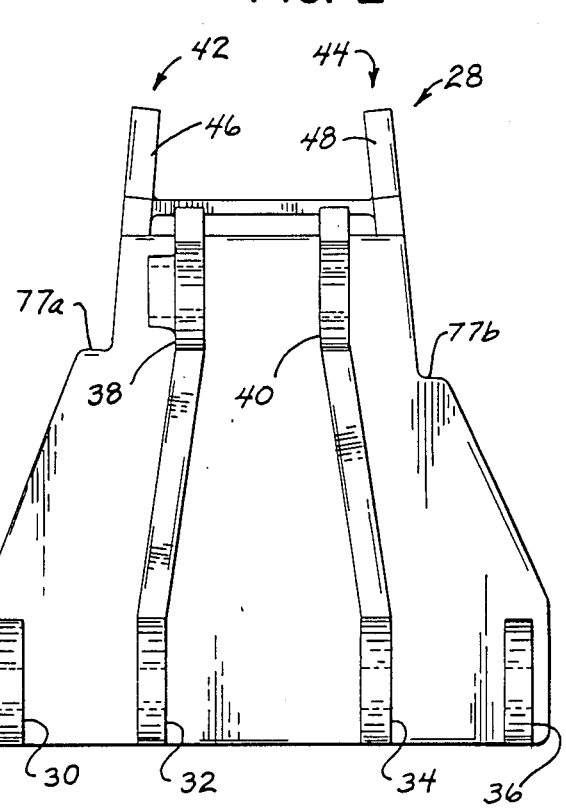
FIG. 2 is a front elevation view of the mounting structure providing at the end of the extendable boom of the vehicle of FIG. 1.
Figure 3:
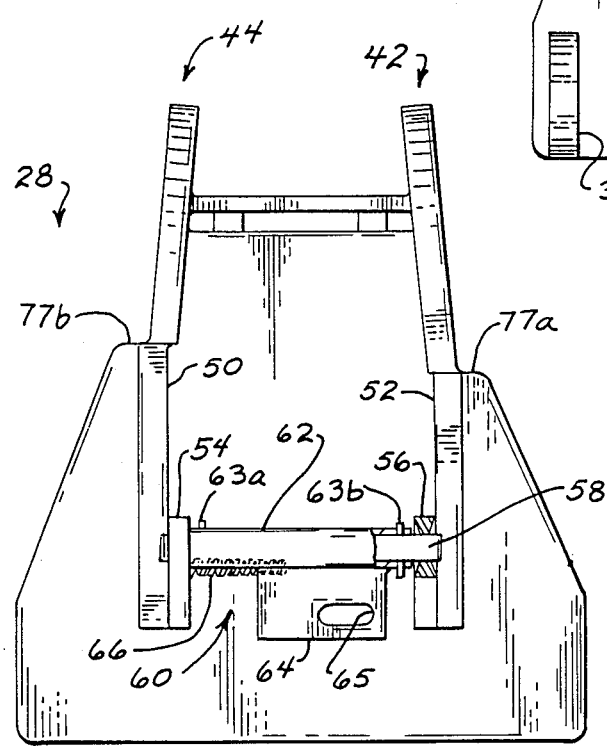
FIG. 3 is a rear elevation view of the mounting structure of FIG. 2.

FIGS. 2 and 3 illustrate a mounting structure 28 adapted for interposition between carriage assembly 22 and support member 18 and the tilt cylinders, such as 26. As shown in FIG. 2, the rear face of mounting structure 28 includes a series of lower connector plates 30, 32, 34 and 36, each of which is provided with an opening therethrough. Connector plates 30, 32 and 34, 36 are adapted to receive a pair of pins therethrough, respectively, for mounting support member 18 to mounting structure 28. A pair of upper connector plates 38, 40 are provided for mounting the tilt cylinders to mounting structure 28. In this manner, the lower end of mounting structure 28 is fixed relative to the remote end of outer boom 16, and the upper end of mounting structure 28 is pivotable forwardly and rearwardly for controlling the orientation of mounting structure 28.

Mounting structure 28 further includes a pair of upwardly extending prongs 42, 44 having rear faces 46, 48, respectively. Prongs 42, 44 are each oriented at an angle relative to the vertical centerline of mounting structure 28, so as to converge toward each other. As shown in FIG. 4 a shaft seat 49 is formed at the base of prong 44, and a like shaft seat is provided at the base of prong 42.

FIG. 3 illustrates the front face of mounting structure 28. As shown, a pair of support members 50, 52 are mounted to the front face of mounting structure 28. A pair of plates 54, 56 are connected to support members 50, 52, and each of plates 54, 56 is provided with an opening therethrough for receiving the ends of a shaft 58. The sides of plates 54, 56 adjacent the opening therethrough are countersunk, as shown in the broken away portion of plate 56.

A latch mechanism, shown generally at 60, is adapted for mounting to shaft 58. Latch mechanism 60 includes a tube 62 mounted to shaft 58 by means of a pair of pins 63a, 63b, and a depending latch member 64 connected at its upper end to the outer surface of tube 62. An opening 65 is provided in depending latch member 64. A cantilevered coil spring 66 is connected at one end to plate 54, and is positioned so that its other end extends past the leftward edge of latch member 64.

With the described construction, any foreign material such as dirt, sand or the like which makes it way between the ends of shaft 58 and the bearing surfaces of plates 54, 56 is purged during rotation of shaft 58. Such purging action is facilitated by the countersunk sides of plates 54, 56 providing a reduced bearing area.

With reference to FIG. 4, a receiving structure is provided on the rear side of carriage 22, with which mounting structure 28 is engageable. Carriage 22 includes a frame 68, which is provided at its rear face with a pair of spaced lugs, one of which is shown at 70, between which a shaft 72 extends. The lower end of carriage frame 68 is provided with a substantially horizontal plate 74. A locking bar 76 is mounted to the upper surface of plate 74.

Referring back to FIGS. 2 and 3, it is seen that mounting structure 28 is provided with a pair of shoulders 77a, 77b. Shoulders 77a, 77b are arranged so as to allow mounting structure 28 to be accepted by the receiving structure provided on carriage frame 68.

The structural elements forming mounting structure 28 and the receiving structure associated with carriage frame 68 having been explained, the sequence of steps for engaging mounting structure 28 with the receiving structure will now be detailed. Carriage 22 is disposed on the ground or other such supporting surface. Mounting structure 28 is then positioned by actuation of the tilt cylinders substantially to the angular orientation as shown in FIG. 4. Mounting structure 28 is then moved rightwardly so that prongs 42, 44 are positioned below and forwardly of shaft 72, whereafter mounting structure 28 is moved upwardly so that base 48 of prong 44 guides shaft 72 into shaft seat 49 provided at the base of prongs 42, 44. Mounting structure 28 thus assumes the position shown in FIG. 4. An upstanding block such as 78 is provided adjacent shaft seat 49 and spaced from prong 44 for securing shaft 72 into shaft seat 49.

After the position of FIG. 4 is attained, the operator lifts mounting structure 28 and actuates the tilt cylinders so as to draw the upper end of mounting structure 28 rearwardly so as to allow mounting structure 28 and the receiving structure to attain their engaged position, as shown in FIG. 5. Carriage 22 is lifted off the ground and pivots in a clockwise direction about a pivot axis defined by shaft 72. During such pivoting movement of carriage frame 68 relative to mounting structure 28, latch member 64 is caused to contact the upper surface of plate 74 and locking bar 76 and to pivot in a clockwise direction up and over locking bar 76. Thereafter, latch member 64 returns partially to its original depending position, with the lower end of latch member 64 engaging the upper surface of plate 74 as shown in FIG. 5. Cantilevered spring 66 assists the gravity bias of latch member 64 in attaining this position and prevents latch member 64 from pivoting therepast during the clockwise pivoting movement of latch member 64 over locking bar 76, thereby providing a stop function.

As shown, the vertical distance between the upper surface of plate 74 and the centerline of shaft 58, to which latch member 64 is mounted, is less than the length of latch member 64. Accordingly, when latch member 64 is pivoted clockwise during movement of carriage frame 68 and mounting structure 28 to their engaged position, with latch member 64 riding over locking bar 76 and returning in a counterclockwise pivoting motion to engage the upper surface of plate 74, latch member 64 is not allowed to fully return to its vertical position. In this condition, carriage frame 68 is securely mounted to mounting structure 28. Any rightward loads placed on carriage frame 68, such as for example by encountering an obstruction or by tilting carriage 68 so as to create a tendency for carriage 68 to pivot about shaft 72, is resisted by engagement of the lower end of latch member 64 with the upper surface plate 74. Of course, any leftward loads exerted on carriage frame 68 are transferred directly to mounting structure 28.

Locking bar 76 serves to prevent leftward movement of latch member 64 along the upper surface of plate 74 and out of engagement therewith.

Shoulders 77a, 77b on mounting structure 28 are designed to be positioned below the lugs, such as 70, to which shaft 72 are mounted. In this manner, the mounting structure and the receiving structure can be matched for specific implements and machine capacities, ensuring that a small capacity machine cannot have an implement adapted for use with a larger capacity machine mounted thereto.

With reference to FIG. 6, in order to uncouple mounting structure 28 from carriage 22, carriage 22 is first positioned such that mounting structure 28 is substantially vertical. In this position, there is no load on latch member 64. Latch member 64 is then manually pivoted in a clockwise direction past spring 66 to attain a release position as shown in FIG. 6. In this manner, the lower engagement provided between mounting structure 28 and carriage frame 68 is relieved. Mounting structure 28 can then be withdrawn from carriage frame 68 by reversing the above-noted steps used for mounting. Mounting structure 28 is withdrawn by simultaneous extension of the tilt cylinders and retraction of the outer boom for providing a clockwise tilting action. When this occurs, block 78 ensures that shaft 72 is retained within shaft seat 49 during pivoting movement of mounting structure 28 out of engagement with the receiving structure. During disengagement, latch member 64 rides along the upper surface of plate 74 and over locking bar 76, as shown in FIG. 7, and out of engagement therewith. After the lower end of mounting structure 20 is rotated out of the receiving structure as described, carriage 22 is lowered to the ground. Thereafter, mounting structure 28 is moved further downwardly so as to disengage the prongs, such as 44, from upper shaft 72.

While manual movement of latch member 64 to its release position has been described, it is understood that any satisfactory means may be utilized. For example, a mechanism employing a hydraulic cylinder or an electric solenoid may be provided for pivoting latch member 64 to its release position. In such a case, spring 66 would not be necessary to maintain latch 64 in its latching position.

Figure 8:
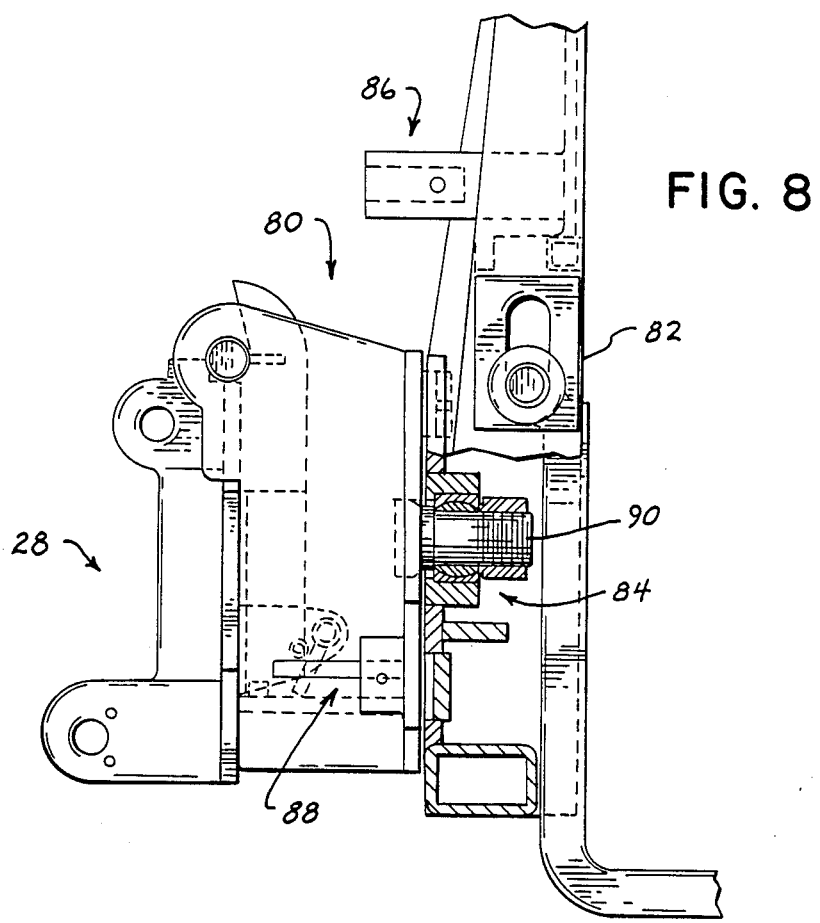
FIG. 8 is a partial side elevation view, with portions broken away, showing a mounting structure engaged with a receiving structure constructed according to the invention, with the receiving structure mounted to a rotating carriage.

FIG. 8 illustrates the invention as utilized in connection with a rotating carriage. In this embodiment, a separate receiver structure 80 is bolted to a rotating carriage frame 82 which includes a bearing assembly 84. A hydraulic cylinder (not shown) is adapted for placement between a rearwardly projecting arm 86 and a mounting bracket 88 for tilting of carriage frame 82 about an axis as defined by a stub 90 extending through bearing assembly 84. Receiver structure 80 generally includes the same components as described above, and accordingly a detailed description is not necessary.

Figure 9:
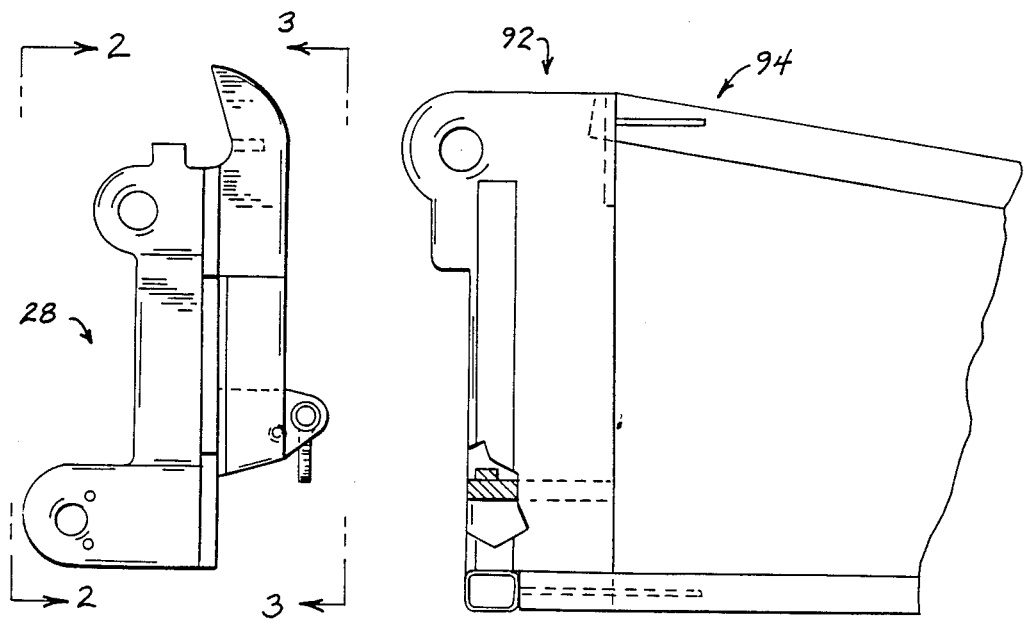
FIG. 9 is a side elevation view illustrating a mounting structure and a receiving structure constructed according to the invention, with the receiving structure provided at the rear end of a truss boom implement.

As shown in FIG. 9, a receiver structure 92 substantially similar to that described above is adapted for mounting at the rearward end of a truss boom assembly 94. Again, the components of receiver structure 92 and mounting structure 28 are substantially similar to that as described above, and a detailed description of structure and operation is not necessary.

As shown, it is to be appreciated that mounting structure 28 and a receiver structure, such as that shown at 80 and 92, can be adapted for use in connection with a number of implements adapted for connection to the end of a boom or other such mechanism. Alternatively, the receiver structure can be built into the implement or tool, as described in connection with FIGS. 4-7.

With the construction as described, it is seen that a relatively simple, rugged and efficient quick attach system is provided for mounting a tool or implement to a boom. Only one manual step is involved, namely pivoting the latch member from its latching position to its release position. The remainder of the steps are all carried out from the operator's cab.

The described quick-attaching mechanism allows engagement of the implement at full boom extension, which may be necessary when reaching over rubbish and material piles. Further, the design allows the operator simply to engage the prongs with the upper shaft and to lift the boom, resulting in self-alignment of the implement with the boom and simultaneous coupling of the implement to the mounting structure. The latch is a nonlubricated, loose fitting assembly requiring little or no maintenance, and will not rust together.

Various alternatives and modifications are contemplated as being within the scope of the following claims particularly pointing out and distinctly claiming the subject matter regarded as the invention.

I claim:

1. A quick-attaching mechanism for coupling an implement to the remote end of a boom structure or the like, comprising:
    a mounting structure provided at the remote end of the boom structure;
    a receiving structure provided on said implement and engageable by said mounting structure for removably attaching said implement to said boom structure;
    upper pivoting engagement means for pivotably engaging said mounting structure and said receiving structure and providing an upper pivot axis, said upper pivot axis providing pivoting movement of said mounting structure and said receiving structure between an engaged position and a disengaged position;
    lower latching means provided on one of said structures, said lower latching means being pivotable between a latching position and a release position and comprising a depending latch member pivotably mounted about a pivot axis to said structure and biased toward a downward position; and
    lower stationary engagement means comprising a plate member mounted to the other of said structures;
    wherein, after movement of said mounting structure and said receiving structure from their disengaged position to their engaged position, the downward bias on said lower latch member causes movement of said latch member to its latching position wherein it engages said plate member, and wherein the distance between said plate member and said latch member pivot axis when said mounting structure and said receiving structure are in their engaged position is less than the length of said latch member, so that said latch member returns only partially to its depending position to attain its latching position, said latch member engaging an upper surface of said plate member to securely couple said implement to said boom structure, whereafter movement of said latch member to its release position uncouples said implement and said boom structure by allowing pivoting movement between said mounting structure and said receiving structure from their engaged position to their disengaged position.

2. The quick-attaching mechanism of claim 1, wherein said upper pivoting engagement means comprises a transversely mounted shaft provided on said receiving structure, and shaft engagement means provided on said mounting structure for engaging said shaft, with the longitudinal axis of said shaft providing the upper pivot axis of said upper pivoting engagement means.

3. The quick-attaching mechanism of claim 2, wherein said shaft engagement means engages said shaft at a pair of laterally spaced points of engagement.

4. The quick-attaching mechanism of claim 3, wherein said shaft engagement means includes a shaft seat and a pair of upstanding prongs extending therefrom for engaging said shaft and guiding said shaft into said shaft seat.

5. The quick-attaching mechanism of claim 1, wherein said depending latch member is mounted for pivoting movement to a latch mounting pin provided on said mounting structure, and said plate member is mounted to said receiving structure.

6. The quick-attaching mechanism of claim 5, wherein said plate member is disposed in a substantially horizontal plane.

7. The quick-attaching mechanism of claim 5, further comprising a locking member mounted toward the rearward end of said plate member, said latch member pivoting over said locking member during pivoting of said mounting structure and said receiving structure to their engaged position so that, when said latch member attains its latching position, said locking member prevents rearward sliding movement of said latch member from the upper surface of said plate member.

8. The quick-attaching mechanism of claim 5, wherein said latch member release position is attained by rearward pivoting movement of said latch member out of engagement with the upper surface of said plate member, so as to allow pivoting movement of said mounting structure and said receiving structure to their disengaged position and uncoupling of said boom structure and said implement.

9. The quick-attaching mechanism of claim 8, further comprising a yieldable spring for contacting said latch member when said latch member is rotated out of engagement with said upper plate surface so as to urge said latch member toward its latching position, said spring being overcome during movement of said latch member to its release position.

10. The quick-attaching mechanism of claim 8, wherein said latch member is manually pivotably movable to its release position out of engagement with the upper surface of said plate member.

11. The quick-attaching mechanism of claim 8, wherein, after movement of said latch member to its release positon, said latch member rides rearwardly on the upper surface of said plate member during pivoting movement of said mounting member and said receiving member to their disengaged position, whereafter said latch member resumes its depending position.

12. The quick-attaching mechanism of claim 1, wherein said mounting structure and said receiving structure are provided with structural means for ensuring that certain implements are mountable to said boom or the like and certain other implements are not mountable thereto.

13. A quick-attaching mechanism for coupling an implement at the remote end of a boom structure or the like, comprising:
a mounting structure provided at the remote end of the boom structure;
a receiving structure provided on said implement and engageable by said mounting structure for removably attaching said implement to said boom structure;
upper pivoting engagement means for pivotably engaging said mounting structure and said receiving structure at two laterally spaced engagement points, and providing an upper pivot axis intersecting said engagement points for providing pivoting movement of said mounting structure and said receiving structure about said upper pivot axis between an engaged position and a disengaged position; and
a single lower depending latch member interposed between said mounting structure and said receiving structure, said laterally spaced upper engagement points and said single lower latching member cooperating to provide a three-point interlock system said latch member being pivotable about a transverse pivot axis between a latching position and a release position and biased toward a downward position; and
lower stationary engagement means comprising a plate member for engagement by said latch member when in its latching position;
wherein, after movement of said mounting structure and said receiving structure from their disengaged position to their engaged position, the downward bias on said lower latch member causes movement of said latch member to its latching position wherein it engages said plate member, and wherein the distance between said plate member and said latch member pivot axis when said mounting structure and said receiving structure are in their engaged position is less than the length of said latch member, so that said latch member returns only partially to its depending position to attain its latching position, said latch member engaging an upper surface of said plate member to securely couple said implement to said boom structure, whereafter movement of said latch member to its release position uncouples said implement and said boom structure by allowing pivoting movement between said mounting structure and said receiving structure from their engaged position to their disengaged position.

14. The quick-attaching mechanism of claim 13, wherein said single lower latching member is substantially centrally located between said two laterally spaced engagement points.

15. The quick-attaching mechanism of claim 13, wherein said upper pivoting engagement means comprises a transversely mounted shaft provided on said receiving structure, and shaft engagement means provided on said mounting structure engaging said shaft at said two laterally spaced engagement points, with said shaft providing said upper pivot axis.

16. The quick-attaching mechanism of claim 15, wherein said shaft engagement means includes a shaft seat and a pair of upstanding prongs extending therefrom and guiding said shaft into said shaft seat.

17. The quick-attaching mechanism of claim 13, wherein said single lower latching member is provided on said mounting structure and said plate member is provided on said receiving structure, for engaging said latch member during movement of said mounting structure and said receiving structure to their engaged position, and causing movement of said latch member to its latching position.

18. The quick-attaching mechanism of claim 5, wherein said latch member is mounted for free rotation to said latch mounting pin, and is biased toward its downward position by means of gravity.

* * * * *